Nov. 26, 1968         C. A. VANSANT         3,413,540
MAGNETIC TEMPERATURE SENSOR
Filed July 14, 1966

INVENTOR.
CARL A. VANSANT
BY Harvey S. Boyd
ATTORNEY

United States Patent Office 3,413,540
Patented Nov. 26, 1968

3,413,540
MAGNETIC TEMPERATURE SENSOR
Carl A. Vansant, 3306 Glenway Drive,
Kensington, Md. 20795
Filed July 14, 1966, Ser. No. 565,326
8 Claims. (Cl. 323—44)

ABSTRACT OF THE DISCLOSURE

A magnetic temperature sensor including a primary driving coil, a plurality of magnetic couplers having differing Curie points and a plurality of second coils mounted around the magnetic couplers.

---

The invention described herein may be manufactured and used by or for the Government for governmental purposes without the payment to me of any royalty thereon.

This invention relates to a temperature sensing device. Heretofore temperature measurement has been accomplished by several means, one of which employed the thermal expansivity characteristics of materials. Examples of this are liquid column thermometers, bi-metal thermometers or gas pressure thermometers. Other means of temperature measurement include the employment of the thermal resistivity characteristics of materials such as with temperature sensitive resistors. Still other means of temperature measurement involve the employment of the thermal-electric or the thermal emissivity characteristics of materials. These means of measuring temperature have been in common use. However, many serious problems have limited the scope of their utility, especially in the areas of instrumentation and control. In the past the commonly used means of temperature measurement required complex and expensive electronic or electro-mechanical complementary equipment. Moreover, the calibration of the prior art temperature sensing devices over long periods becomes problematical. Also response time for these devices tends to be unreasonably long. Accordingly, accurate transmission of the temperature to be measured falls below tolerable limits. The present invention overcomes these disadvantages by employing a unique magnetic temperature sensor having the capability of accurately measuring temperature data which in turn is to be transmitted to a registration point.

Accordingly, one object of this invention is to provide a device that can operate in conjunction with simple, inexpensive, complementary electronic equipment.

Another object is to provide a device which incorporates inherent, permanent calibration.

Another object is to provide a device that will transmit the sensed temperature over long distances without degradation of the information.

Another object is to provide a device which has a short response time.

A further object of this invention is to provide a completely solid-state device which has no moving components or fluids.

A still further object of this invention is to provide a device using a plurality of magnetic couplers with differing Curie points to sense temperature.

While not limited thereto this invention will be described as embodied in a serial magnetic temperature sensor. Said sensor comprising at least one primary coil, a plurality of magnetic couplers and a plurality of secondary coils mounted around the magnetic couplers.

Figure 1:
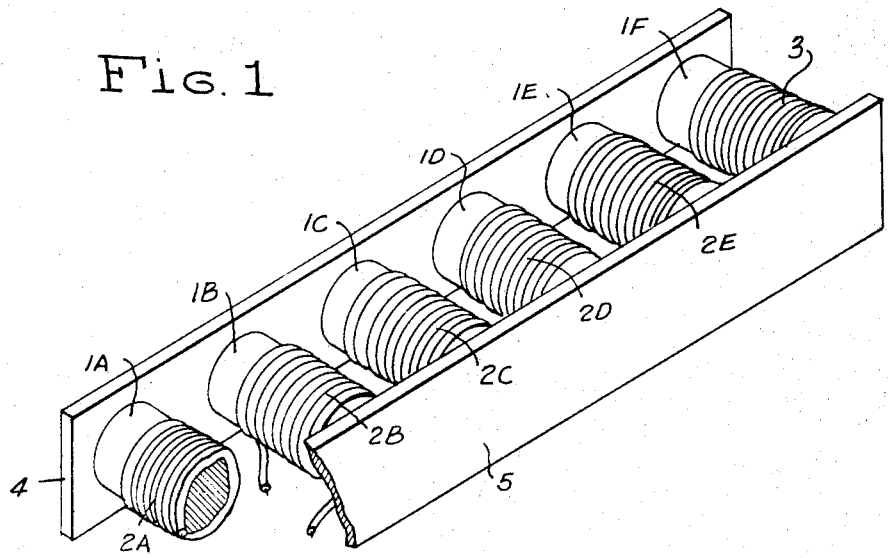
FIG. 1 is a perspective drawing showing one embodiment of the invention.

In FIG. 1, electrical energy in the form of continuous alternating current or pulses is fed into primary coil 3. A series of secondary coils 2a, b, c, d and e are magnetically coupled to the primary coil by means of two mounting bars 4 and 5 which can be fabricated from alloys which contain one or more of the known ferromagnetic elements such as iron, nickel, cobalt, terbium, dysprosium or gadolinium. The primary coil and the secondary coils are mounted around magnetic couplers 1a, b, c, d, e, and f. These magnetic couplers can be fabricated from alloys which contain one or more of the known ferromagnetic elements previously mentioned. Each of the Curie points of the magnetic couplers can be varied by controlling the amounts of alloy added to a ferromagnetic material. This process of varying the ferromagnetic properties for changing the Curie points is known to the prior art. An extremely wide range of Curie points can be achieved by varying the amount and type of alloying material used. Tertiary, quaternary, and other multiple component alloys can be used in addition to the elemental ferromagnetic materials. The principal requirement of a generalized magnetic coupler material is that it must contain at least one ferromagnetic element. Also, for any particular temperature range, the selection of coupling materials will be restricted to alloys that have Curie temperatures within the temperature range of interest. Thus, it can be seen from FIG. 1 that the invention comprises a primary coil 3 mounted around a magnetic coupler 1f. The secondary coils 2a, b, c, d, and e are mounted around magnetic couplers 1a, b, c, d, and e. All of the magnetic couplers are mounted upon bars 4 and 5. When electrical energy is introduced into the primary coil 3 the magnetic flux created, travels along paths defined by the mounting bars 4 and 5 and the several magnetic couplers 1a through 1f thereby forming a closed common magnetic flux path.

The flux paths must be ferromagnetic and must maintain the ferromagnetic property to a temperature as high or higher than the Curie temperature of the highest temperature to be measured. The flux paths are therefore fabricated from a ferromagnetic element or alloy thereof.

In operation the device senses temperature as follows: The primary coil 3 is mounted upon a magnetic coupler 1f having a high Curie point relative to the Curie points in magnetic couplers 1a, b, c, d, and e. The Curie points of magnetic couplers 1a, b, c, d, and e are of differing magnitudes such that the temperature to be sensed can be bracketed. When an individual magnetic coupler is exposed to a temperature which is correspondingly lower that its individual Curie point, then its associated secondary coil will produce large amounts of current in response to the flux induced by the excitation of the primary coil. This is a "GO" condition. On the other hand if the temperature to which the magnetic coupler is exposed falls above its assigned Curie point then negligible amounts of current are produced in the secondary coil. This is a "NO-GO" condition. By delineating the point of division between the "GO" and "NO-GO" condition one can very accurately deduce the temperature to be sensed by referring to the various Curie points assigned to the secondary coils.

Figure 2:
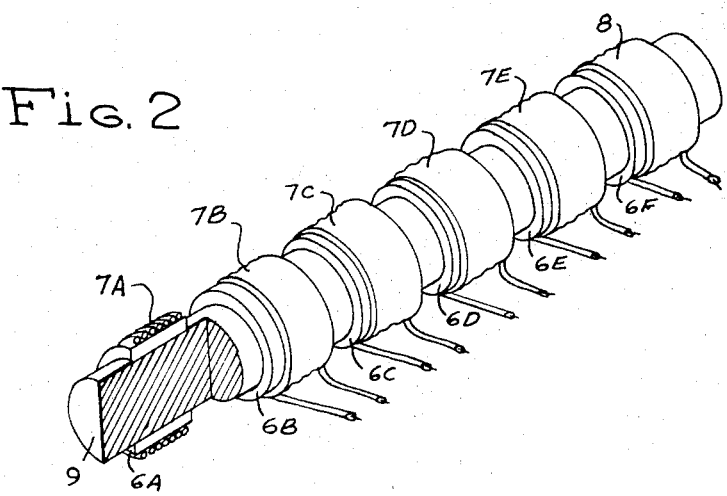
FIG. 2 is another embodiment of the invention.

FIG. 2 shows a second embodiment of the invention. This embodiment involves a ferromagnetic core 9 upon which are mounted magnetic couplers 6a, b, c, d, e and f. These couplers are made of the same material as the magnetic couplers of FIG. 1 and each are designed to have different Curie points. Secondary coils 7a, b, c, d, and e are mounted around the magnetic couplers 6a, b, c, d, and e, respectively. The primary coils 8 is wound around magnetic coupler 6f.

When current is fed into the primary coil 8 a resulting flux path is defined through core 9 and through the magnetic couplers. The method of sensing temperatures is identical to the embodiment of FIG. 1. The use of magnetic couplers of differing Curie points allow one to bracket the temperature by defining the point of distinction between the "GO" and "NO-GO" signals. Again, like FIG. 1 the magnetic coupler 6f corresponding to the primary coil and the flux paths must have a high Curie point relative to the magnetic coupler in the secondary coils.

Since the signals of the secondary coils of both embodiments of the invention are essentially of the "GO," "NO-GO" variety, the complementary equipment can be quite simple. Also, since the signal to noise ratio will be quite large, the information can be transmitted long distances without degradation. Further, the thermal mass of each magnetic coupler can be made small thereby permitting short response times.

Since the device can have a multiple driver (primary coil) and sensors (secondary coil) the reliability can be increased because of the redundancy. In fact, it is possible to make the primary and secondary coils identical so that, essentially, the input signal is given to an appropriate "secondary" (so that it acts as a primary coil) while simultaneously monitoring the output of the other secondary coils.

The invention is amenable to fail-safe temperature sensing since a short circuit or open circuit in one of the sensing coils does not disable the device.

I claim:
1. A device for sensing temperature comprising:
  (a) magnetically permeable sensing members having individually preselected Curie points bracketing a preselected temperature range;
  (b) electromagnetic means for establishing a closed common magnetic flux path through each of said sensing members, said sensing members individually magnetically coupled to react to said magnetic flux path for providing output signals of varying magnitude which are a function of the temperature to be sensed.
2. The device of claim 1 wherein said sensing members comprise:
  (a) a plurality of magnetic couplers having preselected Curie points;
  (b) a coil mounted around each of said couplers.
3. A device for sensing temperature comprising:
  (a) electrical input means for producing magnetic flux;
  (b) a plurality of magnetically permeable sensing members of consecutively assigned Curie points of differing magnitude bracketing a preselected temperature range;
  (c) means for establishing a closed common magnetic flux path between said flux producing means and each of said sensing members, at least one of said members responsive to the input flux when the temperature to be sensed falls below the assigned Curie point of said sensing member for providing an output signal of one magnitude and, at least one of said sensing members being non-responsive to the input flux when the temperature to be sensed rises above its assigned Curie point for providing an output signal of another magnitude, whereby the output signals are indicative of the temperature to be sensed between the range of the Curie points of consecutively responsive and non-responsive sensing members.
4. The device of claim 3 wherein said sensing members comprise:
  (a) magnetic couplers having consecutively assigned Curie points of differing magnitude;
  (b) an electrical coil mounted around each of said couplers.
5. The device of claim 4 wherein said input comprises an electromagnetic coil.
6. A device for sensing temperature comprising:
  (a) a plurality of magnetic couplers having consecutively assigned Curie points of differing magnitude bracketing a preselected temperature range;
  (b) an energized coil for producing magnetic flux;
  (c) a fixed path of magnetic continuity between said coupling members;
  (d) a sensing coil mounted around each of said magnetic couplers, at least one of said sensing coils being responsive to the magnetic flux produced by said energized coil when the temperature to be sensed falls below the assigned Curie point of said sensing coil for providing an output signal of one magnitude, and at least one of said sensing coils being non-responsive to the input when the temperature to be sensed rises above the assigned Curie point of said non-responsive member for providing an output signal of another magnitude, whereby the output signals are indicative of the temperature to be sensed between the range of Curie points of consecutively responsive and non-responsive sensing coils.
7. The device of claim 6 wherein said path comprises:
  (a) parallel ferromagnetic bars mounting said magnetic couplers therebetween.
8. A device for sensing temperature comprising:
  (a) an elongated ferromagnetic core;
  (b) a plurality of mutually spaced magnetic coupler rings having consecutively assigned Curie points of differing magnitude bracketing a preselected temperature range, said coupler rings encircling said ferromagnetic core;
  (c) a sensing coil encircling each of said magnetic coupler rings, at least one of said sensing coils being energized for producing magnetic flux in said core and said coupler rings and at least one of the remainder of said sensing coils being responsive to the magnetic flux produced by said energized coil when the temperature to be sensed falls below the assigned Curie point of said sensing coil for providing an output signal of one magnitude, and at least one of said sensing coils being non-responsive to the input when the temperature to be sensed rises above the assigned Curie point of said non-responsive member, whereby the output signals are indicative of the temperature to be sensed between the range of Curie points of consecutively responsive and non-responsive sensing coils.

References Cited
UNITED STATES PATENTS

| | | | |
|---|---|---|---|
| 1,697,148 | 1/1929 | Spooner | 323—70 XR |
| 2,222,425 | 11/1940 | Wehe | 73—355 XR |
| 2,350,329 | 6/1944 | Hornfeck | 73—362 |
| 3,054,044 | 9/1962 | Shevel | 73—362 XR |
| 3,211,002 | 10/1965 | Franklin | 73—362 |
| 3,266,316 | 8/1966 | Jones et al. | 73—362 |

S. CLEMENT SWISHER, *Primary Examiner.*

FREDERICK SHOON, *Assistant Examiner.*